United States Patent
Dobrean et al.

(10) Patent No.: US 9,659,021 B1
(45) Date of Patent: May 23, 2017

(54) CLIENT BASED BACKUPS AND BACKUP INDEXING

(71) Applicant: EMC Corporation, Hopkinton, MA (US)

(72) Inventors: Adrian Dobrean, Oakville (CA); Dorota Zak, Mississauga (CA); Kenneth William Owens, Burlington (CA); Thomas Papadakis, Burlington (CA)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 336 days.

(21) Appl. No.: 14/085,511

(22) Filed: Nov. 20, 2013

(51) Int. Cl.
*G06F 7/00* (2006.01)
*G06F 17/30* (2006.01)

(52) U.S. Cl.
CPC .............................. *G06F 17/30091* (2013.01)

(58) Field of Classification Search
None
See application file for complete search history.

(56) References Cited

U.S. PATENT DOCUMENTS

| | | | | |
|---|---|---|---|---|
| 5,758,359 A * | 5/1998 | Saxon | ........... | G06F 11/1461 707/644 |
| 5,857,102 A * | 1/1999 | McChesney | ........ | G06F 9/44505 713/100 |
| 6,330,570 B1 * | 12/2001 | Crighton | .............. | G06F 11/1458 |
| 6,571,285 B1 * | 5/2003 | Groath | ................. | H04L 12/2602 370/352 |
| 7,389,311 B1 * | 6/2008 | Crescenti | ............ | G06F 11/1461 |
| 7,441,153 B1 * | 10/2008 | Chitre | ..................... | G06F 21/64 714/38.14 |
| 7,657,716 B2 * | 2/2010 | Kroening | .............. | G06F 11/1441 707/679 |
| 2003/0056180 A1 * | 3/2003 | Mori | ........................ | G06F 17/24 715/247 |
| 2005/0114614 A1 * | 5/2005 | Anderson | ............ | G06F 11/1464 711/162 |
| 2005/0120058 A1 * | 6/2005 | Nishio | ............... | G06F 17/30233 |
| 2006/0288183 A1 * | 12/2006 | Boaz | ..................... | G06F 11/1451 711/164 |
| 2007/0192553 A1 * | 8/2007 | Otani | ................... | G06F 11/1448 711/162 |
| 2008/0028007 A1 * | 1/2008 | Ishii | ...................... | G06F 11/1451 |
| 2009/0125577 A1 * | 5/2009 | Kodama | .............. | G06F 11/1458 709/201 |
| 2010/0332401 A1 * | 12/2010 | Prahlad | ................ | G06F 17/3002 705/80 |
| 2011/0113075 A1 * | 5/2011 | Fukushima | .......... | G06F 12/0246 707/813 |
| 2013/0326159 A1 * | 12/2013 | Vijayan | .................. | G06F 3/0644 711/148 |
| 2014/0280896 A1 * | 9/2014 | Papakostas | ........... | H04W 4/001 709/224 |

* cited by examiner

*Primary Examiner* — Debbie Le
*Assistant Examiner* — Hasanul Mobin
(74) *Attorney, Agent, or Firm* — Workman Nydegger (57) ABSTRACT

Systems and methods for backing up a client or a client's data are disclosed. A client is configured with an agent that enables data of the client to be backed up to a device without a backup server. Indexing information is also stored with the backup.

20 Claims, 4 Drawing Sheets

CLIENT BASED BACKUPS AND BACKUP INDEXING

BACKGROUND

In general, backup operations for a client's data are performed in conjunction with a backup server. The backup server is configured to store and manage the data backed up from the clients. When it is necessary to restore data from one of the backups, the backup server is also involved in this process. The backup server can facilitate locating and identifying the appropriate backup for a restore operation.

While a backup server aids in protecting the data of a client or of a network, there are instances where it may be desirable for a client to back up its own data without involving a backup server. Without a backup server to coordinate the backup and to manage the backup, the ability of a client to backup data to a device becomes difficult. Systems and methods are needed that allow a client to backup and manage data independently of a backup server.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION

Embodiments of the invention relate to systems and methods for backing up data. More particularly, embodiments of the invention relate to systems and methods that enable a client to backup data to a device and/or restore data from the device independently of a backup server or without a backup server. As used herein, a backup corresponds to all data and/or metadata (e.g., a copy of the client's data and indexing information) that is generated and saved during a backup operation. A backup or portion thereof (e.g., the data) may also be referred to herein as a save set.

Embodiments configure the backup such that the client that generated the backup can store, locate, and/or restore the backup without the assistance of a backup server. In addition, embodiments may also include modules that improve the performance of searching for or retrieving a particular backup or save set from among multiple backups or save sets. In addition, the backups generated by a client are configured such that a backup server could incorporate the backups generated by a client into the backups managed by the backup server.

For example, an agent may be installed on a client device. The agent (an example of a client application) is responsible for managing the backup operation that is being performed for a client. The agent may include executable instructions that, when execute, result in a backup operation for the client's data. The agent can determine how and where the data is to be backed up. The agent may also ensure that index information corresponding to the backup is generated and stored with the backup. Some aspects of the backup operation can be determined automatically while other aspects may be determined according to user input. In one example, the parameters can all be determined automatically or based on the parameters used in prior backup operations.

Generally, the data from one backup operation is referred to as a backup or as a save set. The backup can be stored at a certain location on a storage device. Multiple backups may be stored in a single directory on the storage device or in multiple directories. In one example, the path name of the backup identifies several aspects of the backup in addition to the location of the backup data. The path name may identify, by way of example only, a name of the device (a storage device) where the backup is located, an identifier that indicates the application that created the backup or that is associated with the backup, a name of the client or device that created the backup, a unique timestamp of the backup and, the actual file that contains the data (e.g., timestamp.ss). For example, the path could be:

/device-name/client-name/plugin-id/timestamp.ss.

The foregoing example illustrates the path name in the context of a file and directory structure. Alternatively, the parameters in the path name may also refer to fields or tables in a database. Generally, these parameters identify the location and/or attributes of a backup in various contexts.

When the backup operation is performed, an index file (referred to herein as indexing information or an indexing information file) is also generated and is stored on the same destination device and directory and is associated with a corresponding save set file. In this example, the backup can include an indexing information file and a data file such as a save set file. As previously stated, a save set may also refer to both the data file and the indexing information file.

In addition, embodiments of the invention may include modules or methods to ensure that the backups are unique, ensure that the backups are valid, and enable the backups or index files to be searched or located more efficiently during a lookup operation or during a restore operation or for other operations.

The following discussion illustrates embodiments of the invention in the context of a network and in the context of devices, storage devices, and servers that may be part of a network environment.

Figure 1:
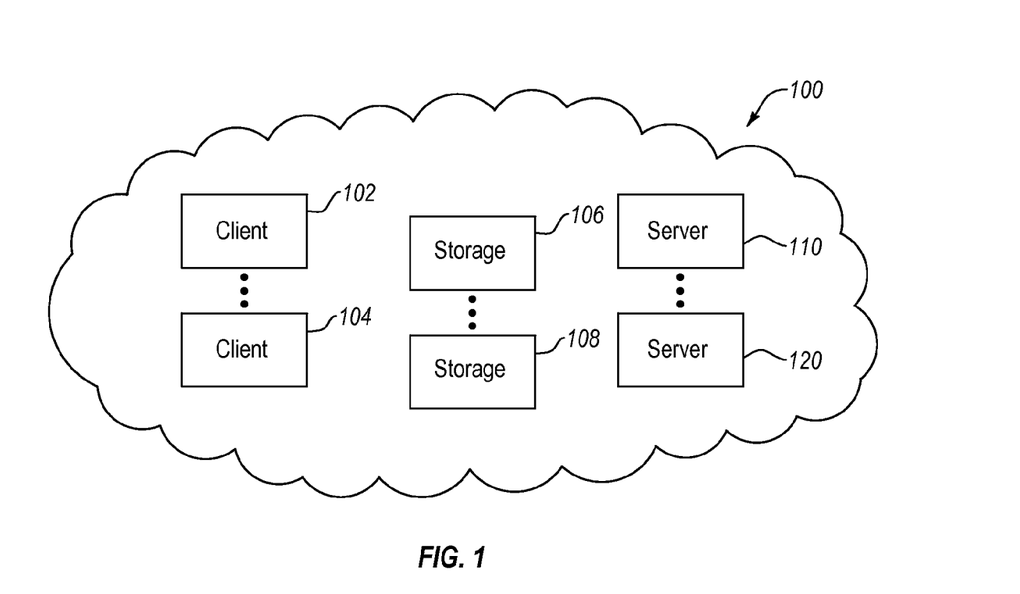
FIG. 1 illustrates an example of an environment for implementing embodiments of the invention.

FIG. 1 illustrates an example of an environment for implementing embodiments of the invention. FIG. 1 illustrates a network 100 that connects multiple devices using wireless and/or wired connections. The network 100 may be a local area network, a wide area network, the Internet, or the like or any combination thereof. Communications on the network 100 occur using appropriate protocols.

The network 100 may include clients, illustrated as clients 102 and 104. The clients can be devices, by way of example only, such as phones, desktop computers, laptop computers, tablet devices, or the like or combination thereof. The clients 102 and 104 may be devices that provide users with access to applications and data existing in the network 100.

FIG. 1 further illustrates servers, illustrated as servers 110 and 112. The servers 110 and 112 may include email servers, backup servers, database servers, file servers, or the like. The clients 102 and 104 may communicate with the servers 110 and 112.

The network 100 also includes storage devices, illustrated as storage devices 106 and 108. The storage devices or storage 106 and 108 may be associated with specific clients or with specific servers, may be network accessible or network based storage, or the like. The storage devices 106 and 108 are also representative of portable storage devices (e.g., a USB drive), storage that is local to a client or a server, storage that is available over a network connection, or the like or any combination thereof. The storage devices 106 and 108 may be any type of memory capable of storing data.

Figure 2A:
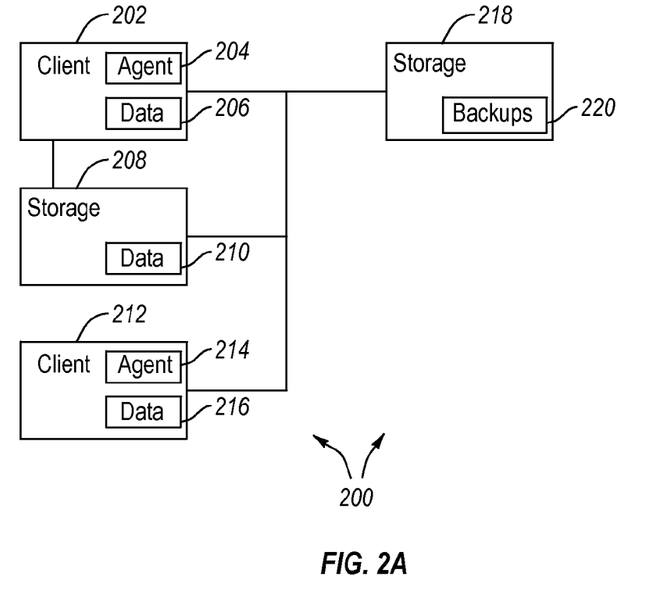
FIG. 2A illustrates another example of a network where a client is configured to backup data directly to a storage device without a backup server.

FIG. 2A illustrates another example of a network 200 where a client is configured to backup data directly to a storage device without a backup server. The network 200 is an example of the network 100. The network 200 includes at least a client 202 and a client 212, which are examples of the clients 102 and 104. The client 202 has data 206 (e.g., stored on a local storage device) and an agent 204 is installed on the client 202. Similarly, the client 212 includes data 216 and an agent 214. The agents 204 and 214 are responsible for backing up, respectively, the data 206 and 216. The agents 204 and 214 may also enable the respective devices 202 and 212 to locate backups, restore backups, search for backups, or the like.

The client 202 is also associated with a storage device 208 (e.g., network attached storage), which stores data 210. The storage device 208 could also be an example of a client that is capable of backing up the data 210 without a backup server. The data 210 may also be associated with the client 202 and the agent 204 may also be configured to backup the data 210 in addition to or separately from the data 206. The storage device 208 may also be available to other devices in the network 200 and may store data associated with those other devices. In some examples, the different devices or clients on the network 200 may be associated with the same data 210 on the storage device 208 or may have access to the storage device 208. As a result, there may be instances where the same data 210 is backed up by different devices in separate save sets or backups or instances where multiple devices are backing up different data on the storage device 208 to another storage device.

When the agent 204 initiates a backup operation to backup the data 206 and/or the data 210, the agent 204 may backup the data to a storage device 218, which is an example of the storage 106 or 108. The storage device 218 is configured, in this example, to store multiple backups 220. In this example, the backups 220 are not managed by a backup server 222, but are created and accessed by the clients in the network 200 such as the clients 202 and 212. As previously stated, the agent 204 controls how and where the data 206 and/or data 210 are backed up to the backups 220 on the storage device 218. Similarly, the agent 214 of the client 212 may also backup the data 216 to the backups 220 of the storage device 218. As a result, the backups 220 may include multiple backups or save sets that are associated with one or more clients in the network 200.

The backups 220 may be arranged in directories, or in other formats or structures. As previously stated, the directories or paths of the various backups may be formulated by various parameters associated with the backups. As a result, backups associated with a particular application (e.g., a database application) may be in a directory that is distinct from a directory used for other applications or other types of databases.

Figure 2B:
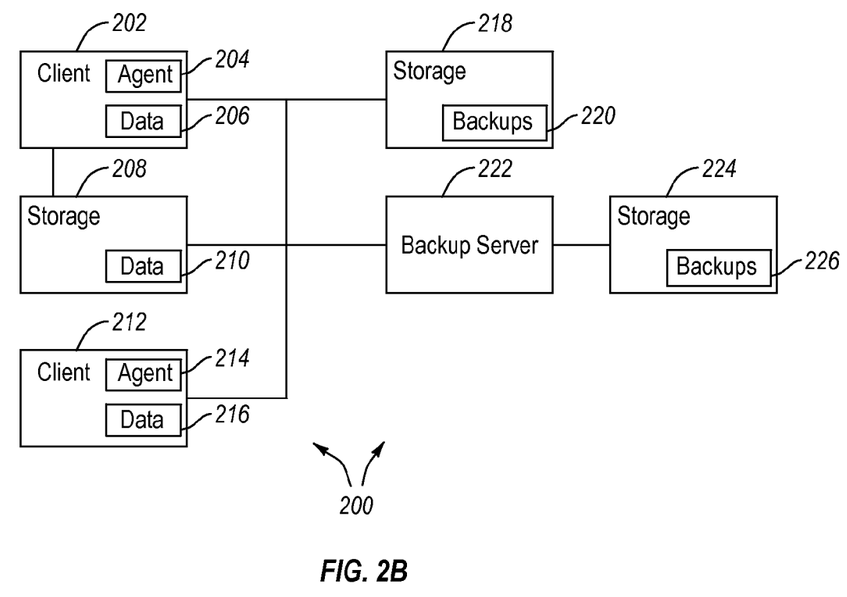
FIG. 2B illustrates an example of a network where data backed up by a client can be incorporated into backups managed by a backup server.

FIG. 2B illustrates an example of a network where data backed up by a client can be incorporated into backups managed by a backup server. FIG. 2B illustrates that embodiments of the invention may be implemented in conjunction with a backup server 222. The backup server 222 could also cooperate with the agents 204 and 214 to generate backups of the data 206, 210, and/or 216. Backups generated when the agents 204 and 214 cooperate with the backup server 222 are typically stored as backups 226 in a storage device 224.

However, embodiments of the invention enable the agent 204 to backup data independently and without the backup server 222 as previously stated. In this example, the backup server 222 may be able to incorporate the backups 220 (which were generated independently of the backup server 222) into the backups 226. The backups 220 and the backups 226 could also be stored on the same storage device in one example.

The agent 204 can generate a backup of the data 206 and/or the data 210 by initiating a backup operation. The backup operation can be initiated based on a predetermined schedule, periodically, in response to user input, in response to an application request, or the like. In addition, a user or other initiator of a backup operation may pass certain parameters to the agent 204, for example, via a user interface that may be presented to a user on a display device associated with the client 202. For example, the destination device may be passed in such that the agent 204 knows where the backup is to be stored. During the backup operation, the agent 204 can determine how and where to backup the data 206 and/or the data 210. Successive backup can be stored to different storage devices or to the same storage device.

After the backup operation is initiated, the agent 204 can begin processing the data to be backed up and initiate transfer of the data as necessary to the destination, which is the storage device 218 in this example. The backup performed for the client 202 can be a full backup, a partial backup, an incremental backup, or the like. The backup may only be applied to the particular application or to a subset of the client's data or to an entire volume. These various factors can be set, for example, via a user interface or determined automatically or be determined based on previously determined parameters.

When performing the backup operation, the agent 204 also generates indexing information that is stored with and included in the backup. In one example, there is a single indexing information file for each backup. The indexing information file typically includes metadata that is specific to the associated backup or save set and may include entries for each of the files backed up in the save set and/or metadata specific to the entire backup.

The agent 204 is also capable of restoring a backup from the backups 220 to the client 202. In one example, the agent 204 may enable a user to search for or lookup a particular backup based on parameters that are provided by the user (e.g., a time period, an application, a specific time, save set ID, device name, or the like). Once the backup is identified and selected, the agent 204 can restore the backup to the client 202 as the data 206 and/or the data 210.

Figure 3:
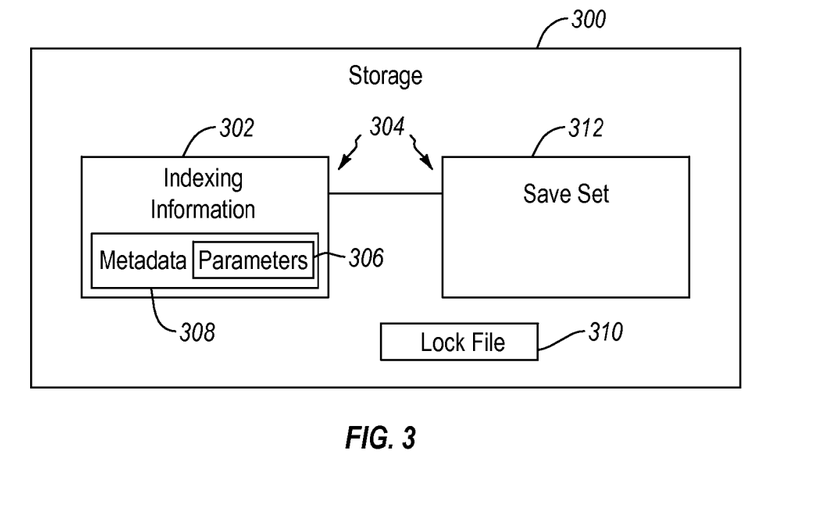
FIG. 3 illustrates an example of a backup or of a save set that has been backed up to a device independently of a backup server.

FIG. 3 illustrates an example of a backup or of a save set that has been backed up to a device independently of a backup server. More specifically, FIG. 3 illustrates a storage device 300 (an example of the storage 218) capable of storing data such as backups on a medium. Although FIG. 3 illustrates a single backup 304, the storage 300 may be storing multiple backups from multiple clients. For discussion purposes, FIG. 3 references the backup 304 as including the indexing information 302 and the save set 312. FIG. 3 thus illustrates that a backup 304 is stored on the storage device 300. The backup includes a save set 312 that is associated with indexing information 302. The save set 312 is a file that contains at least copies of files or data backed up from a client. The data in the save set may also be formatted in a particular manner. The format may be associated with a particular application. The agent on the device generating the backup 304 typically formats the data in the save set 312. The content of the save set 312 may depend on the type of backup operation being performed. An incremental backup, for example, may include only copies of changes that have occurred to the client's data since the most recent backup.

The indexing information 302 may also be a file that is generated before, during, or after the creation of the save set 312. The indexing information 302 includes metadata 308 that relates to or describes the files or entries in the save set 312. The indexing information 302 may include metadata 308 that is specific to individual entries or that is specific to more than one of the files or that is associated with the backup 304 as a whole. Because the indexing information 302 and the save set 312 are each associated with a particular timestamp in one example, the indexing information associated with one save set is not confused with other indexing information associated with other save sets that may be stored in the same directory or on the same destination device.

When the backup 304 is generated, an agent operating on the client may use certain parameters 306. In some example, the parameters 306 can be determined automatically. Alternatively, some of the parameters 306 may be provided by a user via a user interface or accessed from memory. The parameters 306 may determine the location of the backup and describe other information related to the backup 304. The parameters 306, or a portion thereof, are included in the metadata 308 in the indexing information 302. Further, the metadata 308 may be used when a lookup operation is performed.

For example, the parameters 306 can the device name or destination device name, which is the name of the device where backups are located. The parameters 306 can include a plugin-id, which is an identifier that indicates which application created the backup 304. The plugin-id enables the agent to perform a backup operation while accounting for the type of data. For example, a backup operation for a first database type is performed differently than a backup operation for a second database type. The plug-in id ensures that the data of a particular database of an application is handled appropriately by the agent.

The plugin-id is stored in the metadata 308 and enables the agent to properly identify the backup. For example, the application corresponding to a particular backup can be identified. The identification of the application, or the plug-in id, may have an impact on how the backup 304 is organized as well as on the indexing information 302. A client-name identifies the name of the client that created the backup 304. The client name may be the name of the machine that created the backup 304.

In one example, some of the parameters 306 may be provided by a user via a user interface. Some of the parameters 306 may also be generated during the backup operation. For example, a timestamp may be generated for the backup when the backup operation is initiated. There is typically a unique timestamp per directory or per backup. The actual file that contains the backup data is also created during the backup operation and, in some examples, the timestamp may be incorporated into the name of the backup file (e.g., timestamp.ss).

As previously stated, the parameters 306 may identify the location of the backup 304, e.g., /device-name/client-name/plugin-id/timestamp.ss.

The indexing information 302 may be a file (e.g., timestamp.rec) in one example that is associated with the save set 312 (e.g., timestamp.ss). The metadata 308 in the indexing information 302 may include records that identify a backup path, a file set identifier, a timestamp, and other data associated with each entry or with each record of metadata. The metadata 308 may include entries or metadata for every file or entry in the save set 312 such as a file name, a file identifier and/or a timestamp. In one example, the timestamp for each file is the same as the timestamp for the backup 304. Alternatively to or in addition, each file may be associated with a separate timestamp. The metadata 308 may also include metadata related to the backup 304 as a whole. For example, the metadata 308 may include a save set name, a save set, identifier, and the timestamp.

Figure 4:
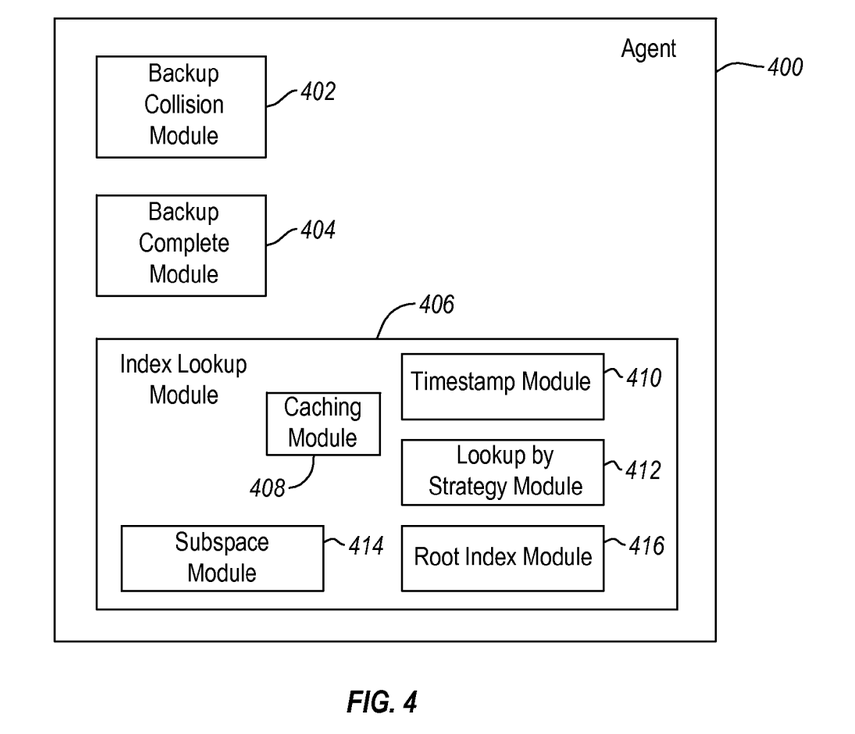
FIG. 4 illustrates an example of an agent that may be associated with a backup operation and a client.

FIG. 4 illustrates another example of an agent 400 that may be associated with a backup operation and/or with a client. The agent 400 is an example of the agent 214 or 214. The agent 400 may include various modules that enable various functionality of a backup operation, a restore operation, a lookup operation, and/or other operations related to the creation, restoration, or management of a backup. The modules include a backup collision module 402, a backup complete module 404, and a lookup module 406. The lookup module 406 further includes other modules that can improve the performance of a lookup operation. These modules include a caching module 408, a timestamp module 410, a lookup by strategy module 412, and sub-space module 414, and a root index module 416. These modules implement various strategies that can improve the performance of a lookup operation or of other operations.

The backup collision module 402 is configured to ensure that each backup stored in a storage device has a unique timestamp. Because multiple clients may try to perform a backup operation at the same time to the same destination device, embodiments of the invention ensure that each backup has a unique timestamp. Embodiments of the invention use a file creation atomic operation when creating the indexing information file (e.g., a .rec file) or when creating another file associated with the backup operation. An atomic operation is an operation that ensures that the timestamp of the backup file being created is unique even when multiple clients are backing up data at substantially the same time. An atomic operation ensures, in one example, that only one process is writing/reading to the memory of the storage device. Other processors or input/output devices cannot access memory until the atomic operation is completed. As a result, the timestamp is unique for each backup.

In another example, if a backup operation is already running when another client attempts to begin a backup operation. When such an attempt is made and it is determined that another backup operation is already running, the timestamp may be incremented by some number (e.g., 1) and the backup operation is retried. If successful, then the timestamp is unique. As a result, embodiments contemplate multiple backup operations that are executing concurrently.

The backup complete module 404 ensures that a backup is valid or ensures that a backup has been completed successfully. In one example, a lock file (e.g., a lock file 310 illustrated in FIG. 3) is created in the same directory where the indexing information file has been created or will be created. In one example, the files that are associated with a particular backup may have similar names (e.g., timestamp.lck (the lock file) and timestamp.rec (the indexing information file) and timestamp.ss (the data file)) such that the association between the lock file and the indexing information file and the data file can be established.

After all of the records have been stored or when all of the metadata is created and stored in the indexing information file and all the data has been stored in the save set file, the lock file is removed or deleted. In other words, as long as the backup operation is being performed, the lock file remains in the same directory as the indexing information file and or the save set file. The lock file is not removed until the backup is completed.

When an index lookup request is made, the resulting lookup operation checks to determine whether the lock file is present. If the lock file is present, this indicates that the backup operation was not completed or was completed unsuccessfully and that the backup is not reliable. If the lockup file has been deleted and is not found, then the backup file is presumably valid and reliable.

The index lookup module 406 is a module that can enhance the performance of a lookup request or of another request relating to a backup. There are multiple lookup strategies that can be accommodated by the index lookup module 406. For example, a timestamp module 410 is a module that performs a lookup operation using, for example, the timestamp stored in the indexing information file. For example, the lookup request may specify a time or a time period. When a query or lookup request is received, the agent reads all of the entries from the destination device and sorts them in order (e.g., descending order) based on the specified time or time period. The sorted list can be traversed until the requested items or number of items are found. The specified time enables the backups stored on the destination device to be sorted based on the specified time and facilitates the ability to more quickly identify the items being looked for. By presenting a sorted list to a user, the user can more quickly identify the backup or backups of interest.

The lookup by strategy module 412 enables the lookup request to take into account the strategy used to create the backup. For example, the lookup by strategy module 412 may include code that is optimized for a one database type (e.g., Oracle) lookup operation. The lookup by strategy module may also include code that is optimized for another database type (e.g., dB2).

For example, backup operations for a first database type may result in backups that are uniquely identified by their timestamp. Backup operations for a second database type may result in backups that are uniquely identified by their name. The lookup by strategy module 412 can optimize the lookup operation for each database type. When searching for the first database type, the lookup operation may focus on the timestamps while the lookup operation for the second database type may focus on the name of the backup. IN this sense, the lookup by strategy module 412 optimized the lookup operation according to the strategy by which the corresponding backups were created. In another example, the plugin-id may be used to identify the algorithms implemented by the lookup by strategy module 412. In one example, the backup strategy may be transparent to a user and all backup operations can be initiated through the same user interface, even if the underlying algorithms for performing the backup operation are different and optimized.

The caching module 412 causes the indexing information files to be read from the device on which they are stored in certain sized chunks (e.g., by way of example only 64 KB chunks) to optimize the read performance of these files and to optimize the lookup operation.

The lookup operation may also use a subspace module 414. When a subspace name is specified, the backups and associated indexing information can be grouped by the substance name. As a result, index store operations, lookup operations, or delete operations can account for the subspace name. For example, when a subspace is identified, the layout of the data and indexing information may be:

/device-name/plugin-id/client-name/subspace-name/index/timestamp.ss and

/device-name/plugin-id/client-name/subspace-name/index/timestamp.rec, where timestamp.ss is the backup file and timestamp.rec is the indexing information file. For example, the sub-space name can be associated with a day of the week or with other parameter. If a user is searching for backups associated with a particular day of the week, then the lookup operation can focus on a smaller subset of backups. In effect, the use of a subspace enables the backups to be groups according to the subspace and enables lookup operations to be optimized.

Another module is the root index module 416. In this example, when the root index database is specified in the index store, lookup operations and delete operations can used the mot index database for store, lookup, and delete of backups. In this example, the layout may be:

/device-name/plugin-id/client-name/subspace-name/index/rootidx.rec.

In one example, a particular directory may include many backups and searching for a particular backup may require all of the backups to be evaluated. By including a root index in the directory, the lookup operation can be optimized. The root index file may contain metadata that describes all of the backups in the directory. In addition, more than one mot index may exist. For example, a root index for backups associated with each application may exist.

Figure 5:
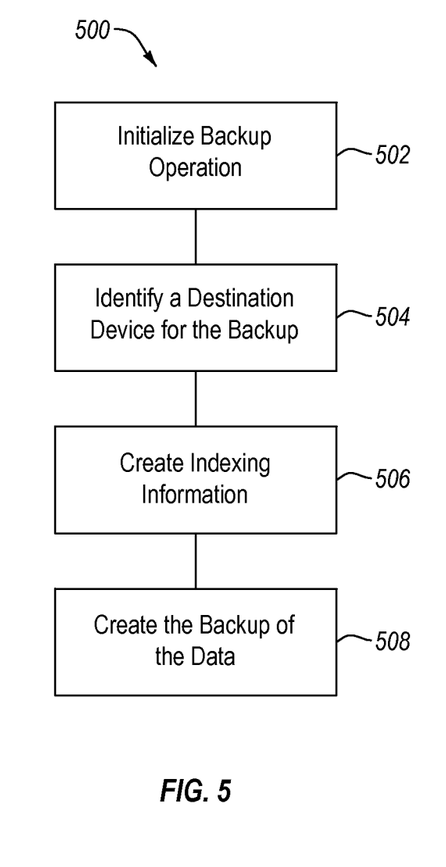
FIG. 5 is an example of a flow diagram for performing a backup operation without a backup server.

FIG. 5 is a flow diagram of a method 500 for performing a backup operation without a backup server. The method 500 often begins a backup operation is initialized in box 502. Initializing the backup operation can include, by way of example, presenting a user interface, receiving one or more parameters of the backup operation from a user via the user interface, or automatically determining at least some of the parameters of the backup operation. For example, the parameters can include identifying the name of the client (e.g., machine name) performing the backup operation, a destination device, an identification of the application being backed up (e.g, plugin-id), a sub space, a root index, a timestamp, or the like. Initiating or initializing a backup operation can also be performed in response to user input, periodically, or in an automated manner.

In box 504, a destination device for the backup of the client's data is identified. As previously stated, the destination device may be part of the parameters or may be determined automatically by the agent. In box 506, indexing information is created. In one example, an indexing information file is created to store the indexing information. By creating this file with an atomic operation, a unique timestamp can be guaranteed even if other agents or clients are attempting to generate a backup at substantially the same time or even when another backup operation is in progress. The indexing information may be arranged in a table form and include records for each entry in the backup. The indexing information may also include metadata that is general for the backup as a whole or generic to records. For example, the indexing information can include the name of the backup or the save set names, a timestamp, a backup path, a file set identifier as constructed by a caller, or the like.

In box 508, the backup of the data (e.g., the save set) is generated by actually backing up the data to the destination device. The backup is then associated with the indexing information file. As discussed with reference to FIG. 3, the indexing information 302 and the save set 312 can be generated concurrently or at different times. In addition, the save set 312 can be generated before the indexing information 302 or the indexing information 3402 can be generated before the save set 312.

Embodiments of the invention also ensure that the timestamps are unique. This can prevent backup collisions and prevent the backups from being harmed or interpreted incorrectly.

Figure 6:
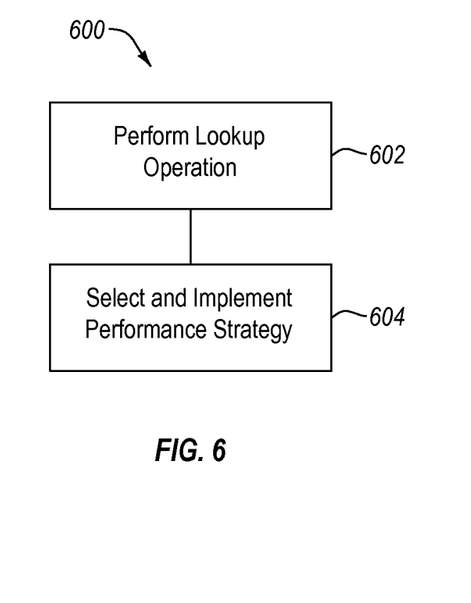
FIG. 6 is an example of a flow diagram for performing a lookup operation.

FIG. 6 illustrates an example of a flow diagram for performing a lookup operation. The method 600 can be performed as part of a backup operation or independently or as part of a restore operation. In box 602, a lookup operation is performed. This may include presenting a user with a user interface in which the lookup operation can be configured. For example, the user may be able to provide a time, identify an application, identify specific data, identify a destination device, or the like or combination thereof. Because the destination device may be portable (e.g., a USB drive or the like), it may be necessary to identify the device on which to perform a lookup operation and/or from which to perform a restore operation and/or on which to perform a backup operation.

In box 604, the lookup request is optimized by employing one or more enhancement strategies that are embodied in various modules or that are simply included in the agent. The enhancement strategies employed may depend on the information provided via the user interface. For example, if a time is specified, then the performance of the lookup request can be enhanced by accessing the backups based on the time and by presented results that are sorted in some order (e.g., ascending or descending) based on the time. Another strategy may depend on the application associated with the backup. Because the data of some applications is backed up differently from that of other applications, the lookup request can be formulated to specifically to the associated application or the agent will automatically apply a specific method for looking up the backup. In another example, knowledge of the sub space or of the root index can also be used to improve the performance of the lookup request.

In another application, the lookup request can be used to identify a particular backup that may be imported to backups maintained by a backup server.

Embodiments of the present invention may comprise or utilize a special purpose or general-purpose computer including computer hardware, such as, for example, one or more processors and system memory, as discussed in greater detail below. The various modules identified herein may be executed by a processor on a computing device.

Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Computer-executable instructions comprise, for example, instructions and data which cause a general purpose computer, special purpose computer, or special purpose processing device to perform a certain function or group of functions.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up data of a client, the method comprising:
    initializing a backup operation to backup data associated with a client device;
    identifying a destination device for a backup of the data;
    creating indexing information for the backup, wherein the indexing information includes metadata for each file included in the backup;
    creating a backup save set of the data associated with the client device based on parameters without a backup server, wherein the save set and the indexing information are included in a backup that is stored on the destination device, wherein the backup is configured such that the backup can be restored without a backup server and is configured to be incorporated into backups managed by the backup server, wherein the backup is configured to be restored by the backup server when incorporated into the backups managed by the backup up server; and
    storing the backup on the destination device, wherein a path name of the backup on the destination device includes at least some of the parameters used in creating the backup.

2. The method of claim 1, further comprising identifying the parameters for the backup operation, the parameters including one or more of the destination device, an identifier that identifies an application associated with the backup, a plug-in id, a subspace, a root index, or a name of the client device that initialized the backup.

3. The method of claim 1, further comprising generating a timestamp for the operation, wherein the timestamp is included at least in the indexing information.

4. The method of claim 1, wherein the indexing information includes records for each file in the save set and wherein the indexing information or the save set is created by an atomic operation.

5. The method of claim 2, further comprising storing the backup in a directory identified by the path name.

6. The method of claim 1, further comprising:
    creating a lock file while the backup is being created; and
    removing the lock file after the backup is completed.

7. The method of claim 1, wherein multiple backups are stored on the destination device, further comprising performing a lookup operation for a particular backup using a lookup strategy to improve performance of the lookup operation, wherein the lookup strategy is at least one of a caching strategy, a timestamp strategy, a lookup by backup strategy, a subspace strategy, or a root index strategy.

8. The method of claim 1, wherein the client device determines where and how the backup is stored.

9. A system for enabling a client to backup of data of the client on a destination device such that the backup is created independently of a backup server, the system comprising:
    an agent installed on a client that includes a processor, the agent configured to perform a backup operation of data associated with the client to generate a backup of the data, the agent configured to:
    perform a backup operation of the data of the client based on one or more parameters that are received by the agent or that are automatically identified by the agent without a backup server, wherein the one or more parameters include at least a destination device;
    create indexing information on the destination device, the indexing information including a timestamp;
    creating a save set of the data on the destination device, wherein the backup includes the save set and the indexing information and is uniquely associated with the timestamp, wherein a pathname of the backup on the destination device includes at least some of the one or more parameters used in performing the backup operation; and
    storing the save set on the destination device.

10. The system of claim 9, wherein the parameters include one or more of the destination device, a plugin-id, a client-name, an index, a subspace or a root index.

11. The system of claim 9, wherein the agent generates the timestamp by causing an atomic file creation to be performed such that the timestamp is unique.

12. The system of claim 10, wherein the backup is stored in a directory identified by the path name.

13. The system of claim 11, wherein the agent is configured to create a lock file in the directory with the indexing information file and the save set, wherein the lock file and the indexing information file and the save set are related by the timestamp, wherein the agent is configured to remove the lock file after the backup is completed successfully, wherein the backup is deemed unreliable if the lock file remains in a directory associated with the backup.

14. The system of claim 9, wherein the agent comprises an index lookup module configured to enhance at least lookup operations for one of the backups stored on the destination device.

15. The system of claim 14, wherein the index lookup module includes:
- a timestamp module configured to perform a lookup request in the backups based on a time provided to the agent via a user interface, wherein the agent presents results of the lookup request sorted according to the time provided to the agent;
- a lookup by strategy module that performs the lookup request based on how the backups were created or based on the applications associated with the backups;
- a subspace module that performs the lookup request based on a subspace associated with the backup; and
- a root index module that performs the lookup request based on the root index associated with the backups.

16. The system of claim 9, wherein the agent is configured to group the backups of the data of the client according to a subspace or a root index and the agent is configured to perform backup operations, lookup operations, and delete operations based on one or more of the parameters.

17. A method for performing a backup operation for data of a client, the method comprising:
- presenting a user interface on a display device associated with a client;
- receiving input via the user interface, wherein the input includes at least one of the parameters for performing the backup operation;
- performing the backup operation without a backup server, wherein the parameters identify at least destination device for a backup of the data of the client, the backup including an indexing information file and a save set file;
- creating the indexing information file in a directory of the destination device and the save set file in the directory;
- obtaining a timestamp when the indexing information file or the save set file is created, wherein the timestamp is unique to the backup; and
- storing the save set in the directory with the indexing information file without involving a backup server, wherein at least some of the parameters used in performing the backup operation are included in a pathname of the save set on the destination device and wherein the save set is configured to be incorporated into backups maintained by the backup server.

18. The method of claim 17, wherein some of the parameters are included in a path of the directory, further comprising ensuring that the backup is complete and valid using a lock file that is associated with the timestamp and that is removed from the directory when the backup operation is completed.

19. The method of claim 17, further comprising performing a lookup operation for at least one backup stored on the destination device, wherein the lookup operation is based on at least one strategy to improve a performance of the lookup operation, the at least one strategy including a strategy based on the timestamp, a strategy based on how the backup was created, a strategy based on a subspace of the indexing information file, or a strategy based on a root index of the indexing information file.

20. The method of claim 17, wherein the parameters include one or more of the destination device, a plugin-id, a client-name, an index, a subspace or a root index.

* * * * *